United States Patent [19]
De Bruyn et al.

[11] Patent Number: 4,899,712
[45] Date of Patent: Feb. 13, 1990

[54] FUEL INJECTION RAIL MANUFACTURING MEANS AND PROCESS

[76] Inventors: Gerard De Bruyn, 30, rue Auguste Blanqui; Daniel Ciecko, 2, rue Romain Rolland, both of 94250 Gentilly, France

[21] Appl. No.: 157,900

[22] Filed: Feb. 19, 1988

Related U.S. Application Data

[63] Continuation-in-part of Ser. No. 622,712, Jun. 20, 1984, abandoned, and a continuation-in-part of Ser. No. 91,307, Aug. 28, 1987, abandoned.

[30] Foreign Application Priority Data

Jun. 21, 1983 [FR] France ............................... 83 10251
Oct. 31, 1986 [FR] France ............................... 86 15206

[51] Int. Cl.$^4$ .................... F02M 39/00; B22D 11/126
[52] U.S. Cl. .................... 123/468; 123/469; 123/456; 29/527.6; 29/DIG. 47; 138/177
[58] Field of Search ............. 123/468, 469, 470, 471, 123/472, 456; 29/527.6, 527.3, DIG. 47, 81 R; 138/177, 115

[56] References Cited

U.S. PATENT DOCUMENTS

| | | |
|---|---|---|
| 3,335,481 | 8/1967 | Haentjens ........................... 29/527.6 |
| 3,698,070 | 10/1972 | Sejournet ....................... 29/DIG. 47 |
| 3,929,109 | 12/1975 | Chamberlain ....................... 123/468 |
| 4,457,280 | 7/1984 | Hudson ................................ 123/468 |
| 4,494,297 | 1/1985 | Larsson ............................. 29/527.6 |
| 4,751,904 | 6/1988 | Hudson ............................... 123/470 |
| 4,798,187 | 1/1989 | Hudson ............................... 123/470 |
| 4,805,575 | 2/1989 | de Concini ......................... 123/456 |
| 4,809,743 | 3/1989 | Sukimoto ........................... 123/456 |

FOREIGN PATENT DOCUMENTS 2024937 1/1980 United Kingdom ............... 123/468

*Primary Examiner*—Carl Stuart Miller
*Attorney, Agent, or Firm*—Fred A. Keire

[57] ABSTRACT

The invention concerns a method of manufacturing a single-block fuel injection rail. The rail according to the inventive process comprises at least one rectilinear hollow tube, to which are joined at least one fuel intake tip, at least one injection intake and rail fastening means. The method comprises striking, in the hot state, a metal billet placed in a die, imparting thereto a longitudinal solid primary shape having transverse branching, whose axes are perpendicular to the longitudinal axes of the primary form, and cooling and machining the primary form so as to give the rail its final shape. The rail is formed from an aluminum alloy and the billet is struck at a temperature between about 430° and 460° C. The process may be used in the manufacture of fuel injection rails for the automobile industry.

5 Claims, 4 Drawing Sheets

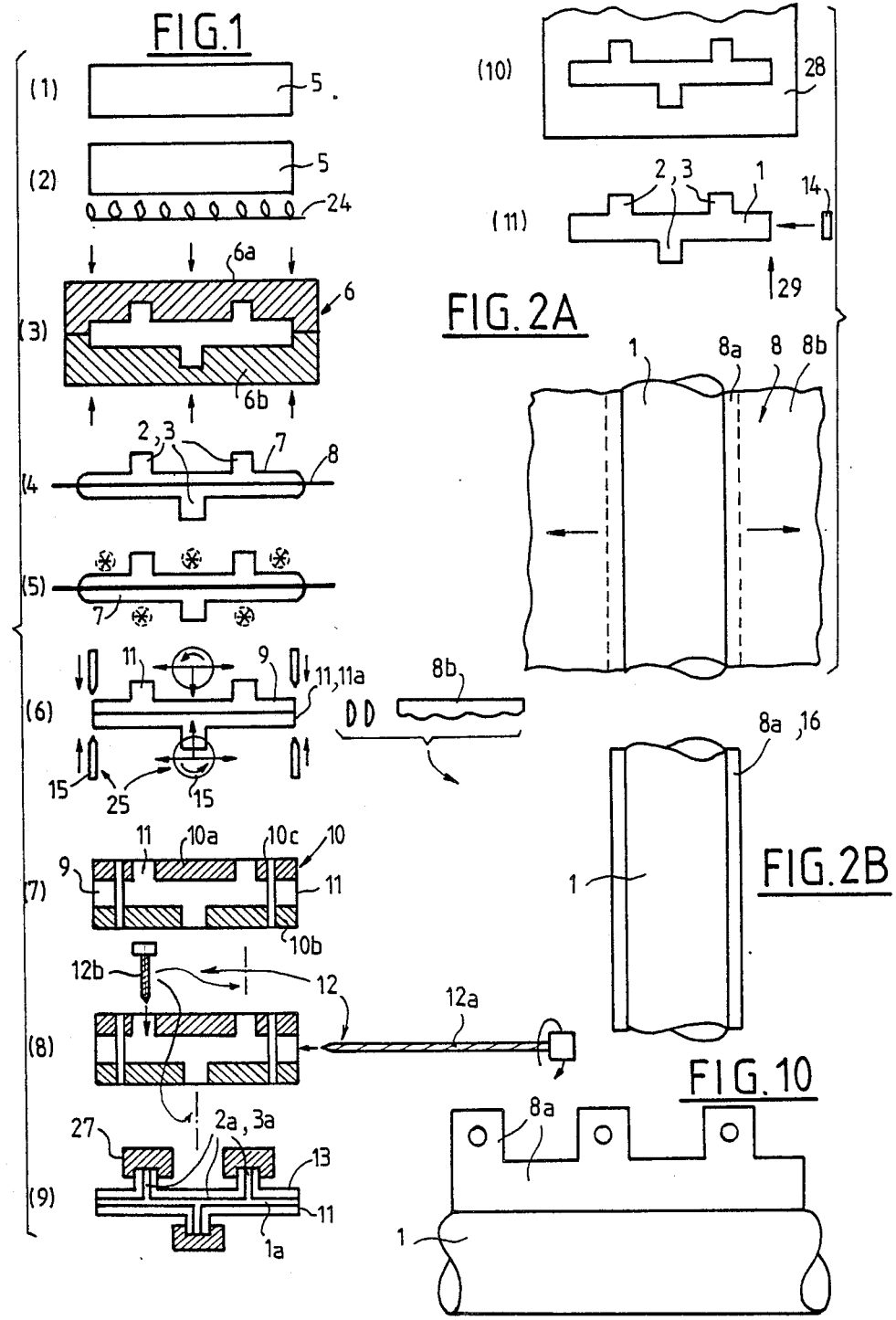

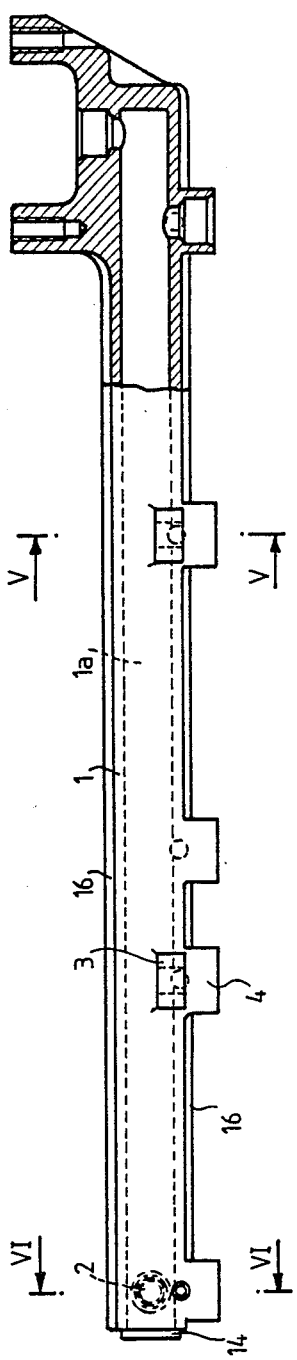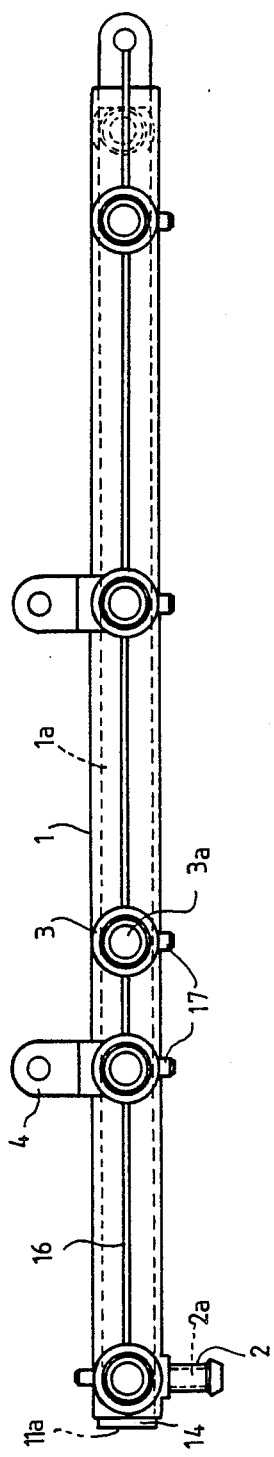

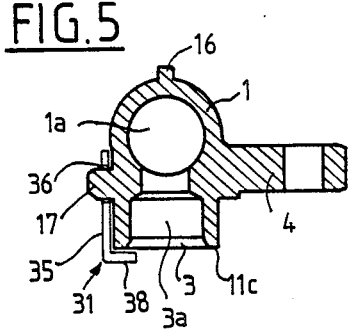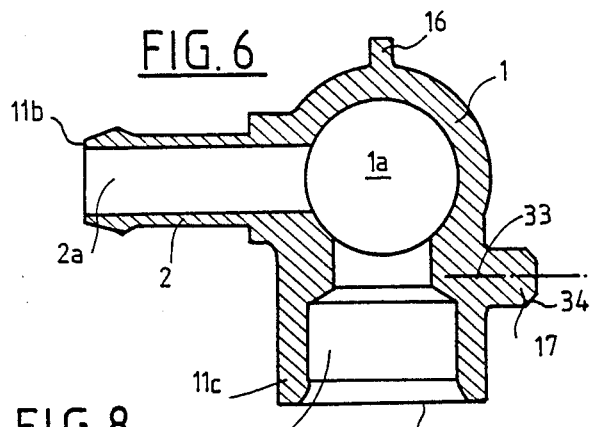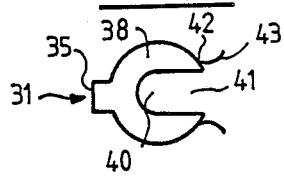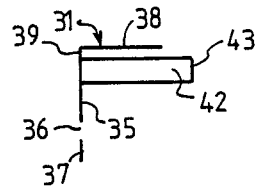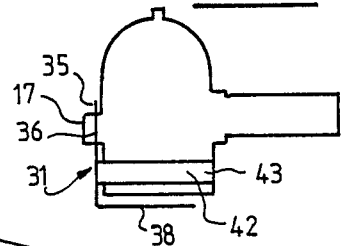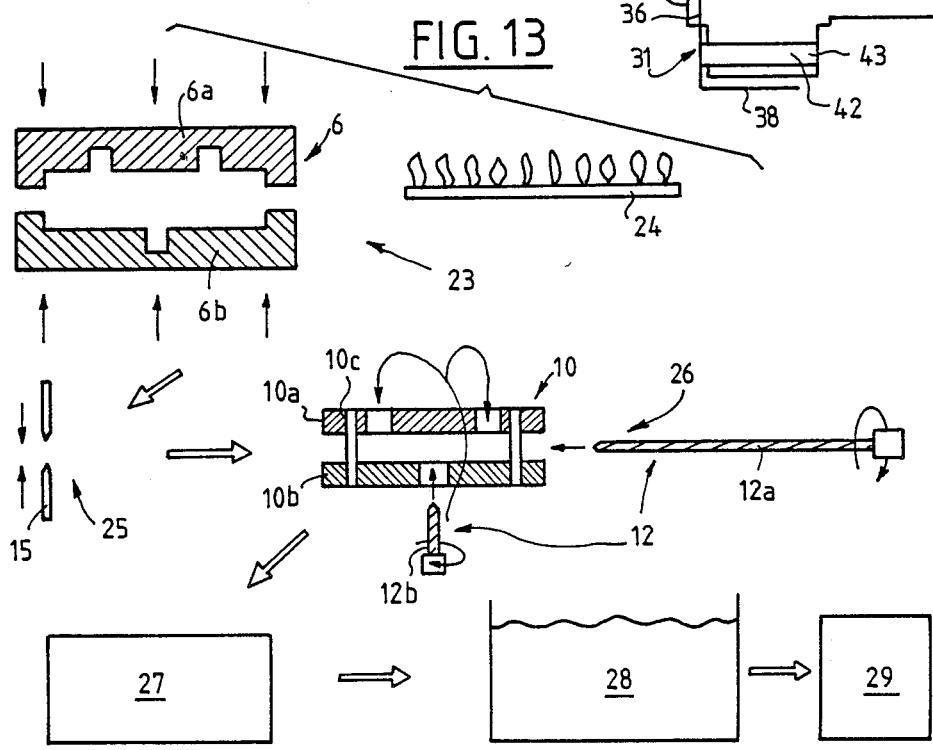

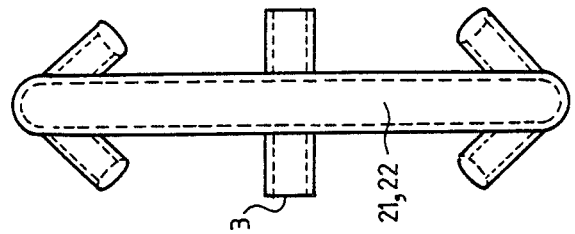
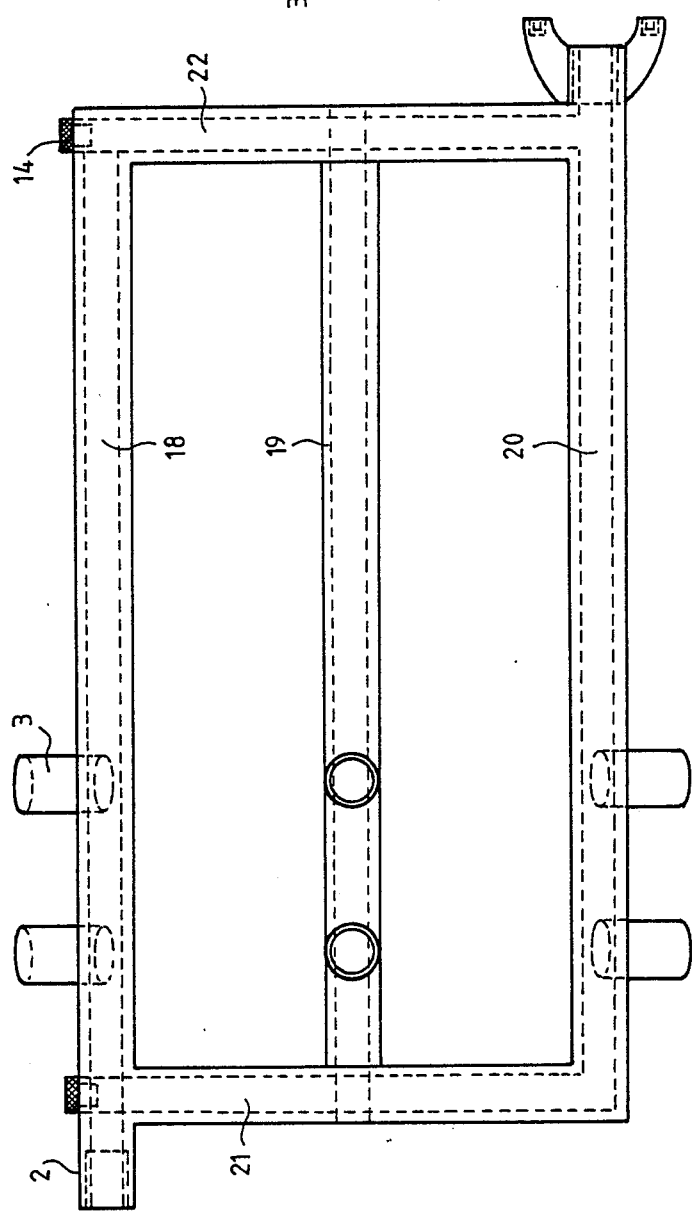

FUEL INJECTION RAIL MANUFACTURING MEANS AND PROCESS

This application is a continuation-in-part of Ser. No. 06/622,712 filed Jun. 20, 1984, and Ser. No. 07/091,307 filed Aug. 28, 1987, now both abandoned.

The invention concerns a fuel injection rail manufacturing means and process and fuel injection rail made according to this process.

We already know from European Patent 132 418 of a manufacturing process for a fuel injection rail made of aluminium alloy which includes the following successive process stages: hot pressing, machining, drilling, deburring, and welding or brazing of an end plug. A rail made according to this manufacturing process is single-block, weldless-except for the end plug weld, and light-weight. Furthermore, the inner intersections between the main tube and the injector and fuel intake are rounded.

This invention concerns improvements which can be applied to the aforesaid process and rail. These improvements consist, firstly, in making use of the aluminium alloy extrusion buckles produced during the hot pressing stage. These extrusion buckles are normally considered as undesirable and, therefore, as having to be removed. According to the invention, instead of removing these buckles, we leave in existence all or part of the edge of each buckle abutting on the man tube of the rail. Thus we form a single-block, continuous or noncontinuous, longitudinal stiffening flange which came from the manufacturing process with the man tube and the stiffening effect of which is surprising, taking into account the size of this flange (e.g., a cross straight section of a generally square shape of 2.5 mm size per side). This stiffening is particularly important for a fuel injection rail designed to be impact resistant. It is obtained without increasing significantly the weight of the aluminium alloy used, without increasing significantly the size of the rail, and without making the manufacturing process more complicated, lengthier, and more expensive. Furthermore, we can also use other buckle areas as functional areas, e.g., as means for fastening purposes.

According to another characteristic feature of the invention, the rail has a supporting boss for an injector fastening clip held by the injector intake, the outer lateral face of which is cylinder-shaped with a circular base and the outside of which is not provided with a recess or, on the contrary, with a groove as is generally the case in the state of the art (cf. French Patents 2 452 005 and 2 444 813).

These characteristic features are obtained with a single-block rail which provides the combined advantages of lightness; of the absence of welds-except for, possibly, an end plug; the advantages connected with using an aluminium alloy as opposed to the state of the art where steel is being used (cf. French Patents 2 437 503; 2 507 212 and 2 274 854); with the incurvated connections of the main tube and of the injector and fuel intakes; with shapes which may be warped, in particular where the direction of the fuel and injector intakes as compared to the main tube is concerned; with excellent stiffness and with torsional strength and buckling strength as well as with impact rsistance; with excellent resistance to high pressures; with a homogenous internal structure of he material of which the rail is made, as opposed to the state of the art as shown by French Patents 2 437 503; 2 507 212; 2 274 854; 2 169 088 and 2 444 813, and with the aluminium alloy fibres all in one and the same direction, this being achieved by pressing. These characteristic features are obtained as opposed to the state of the art where, firstly and usually, the rail is made of a steel tube to which the injector and fuel inlets are welded (cf. French Patent 2 452 005 and nonexamined German Patent Application 3 132 432), with the drawbacks of creating areas of weakness in welding or brazing spots; of causing corrosion of the rail; of making the deposition of oxide scale easier; of making the deformation of the rail easier, particularly when it is passing through an oven, therefore lessening high precision with the rail, finally, being heavy.

Secondly, a rail of the prior art has steel or brass tube sections and flexible rubber connections (cf. French Patent 2 444 813) which cause leaks through the deterioration of the connections, is not very safe, and has a complicated assembly.

Thirdly, a rail of the prior art is made by casting (cf. British Patent 2 073 316), in which case only shapes suitable for casting can be made, but the rail is porous and has low mechanical strength.

Fourthly, a rail of the prior art is made by extrusion (cf. French Patent 2 169 088), which makes the manufacture of the injector cups very complicated and requires many machining runs.

The present invention also allows for making a flat rail with several main tubes linked by one or, generally, several cross tubes, while the fuel and injector intakes, as well as the fastening means, are joined to these main and/or cross tubes with the extrusion buckles kept entirely or partly as functional areas, in particular for fastening means. Such a rail forms a flat system, plane or almost plane, as opposed to rails according to the state of the art which are essentially longilinear. Such a specially designed flat rail may then be assembled conveniently in certain engines.

For this purpose, the invention first proposes a manufacturing process for a single-block fuel injection rail of a type with one rectilinear main hollow tube, at least, to which are rigidly joined one fuel intake tip, at least; one, and generally several, injector intakes, at least, and rack fastening means, characterized in that we heat an aluminium alloy billet to a temperature in the range from 440° C. to 450° C. and we place it, in this heated condition, in a die made of two parts.

We carry out hot die work on the billet, and for this purpose we hammer it through the intermediate of the die so as to provide it with a full primary shape which corresponds, significantly, at least, to the outer shape of the rail to be made and which has, furthermore, one or several axial, in particular, longitudinal, buckles, which consist of the extruded aluminium alloy.

We leave the primary form made in this manner to cool down to ambient temperature.

We carry out a first cold machining run of the primary form, i.e., essentially, we cut it to the exact axial size required.

We remove the superfluous extrusion buckle(s) while we leave the functional areas in existence so as to obtain a secondary full form which corresponds partly, at least, exactly to the outer form of the rail to be made in view of allowing later its support in a precise position.

We place the secondary form in a precision assembly, and we join the secondary form rigidly to this assembly, in particular by mechanical clamping so that the secondary form is held firmly and in a precise position by the assembly while the outer ends of the secondary form have to be presented for drilling which remains accessible from the outside.

We cold-drill the secondary form from the outer ends using one or several drills in order to achieve, successively, the main drilling of the main tube and the secondary drillings for the fuel intake and the injector intake and in order to obtain this manner a tertiary drilled form.

We carry out a second cold-finishing machining run on the tertiary form in order to achieve the detailed making of the fuel junction tips, in particular by threading the outer ends of the rail, the injector intakes, and the rail fastening means.

We carry out electrochemical deburring and cleaning.

Possibly and if required, we fit a plug rigidly to the outer end of the main tube by welding or brazing.

According to other characteristic features of the process, we leave at least one part of the buckle abutting the main tube in existence, or we make at least one boss on one injector intake.

The invention then proposes a plant, i.e., a combination of means, for applying the process detailed above, characterized in that it has a production line which features upflow and downflow and, possibly, more or less imbricated inbetween:

- a die-working station with associated heating means;
- a first machining station with cutting means;
- a drilling station;
- a second machining station, separate or not from the first machining station;
- an electrochemical deburring and cleaning station, and
- possibly one plug welding or brazing station.

Finally, the invention proposes an injection rail which has one single-block, regular or not, continuous or not, longitudinal rigidification bulge which has come from the manufacturing process with the main tube.

The other characteristic features of the invention will be understood further by means of the appended drawings, wherein:

FIG. 1 is a schematic view of the various stages of the process according to the invention;

FIGS. 2A and 2B are two schematic views of a primary form of the rail according to the invention which show the removal of the superfluous areas of the extrusion buckle;

FIGS. 3 and 4 are two schematic elevation views according to two direction perpendicular one to the other, of a design form possible but not restrictive, of a rail which can be made by the process according to the invention;

FIG. 5 is a schematic cross view according to lline V—V of FIG. 3 which shows an injector intake of the rail of FIG. 3 with one injector holding clamp;

FIG. 6 is a schematic ross view according to line VI—VI of FIG. 3 which shows a fuel intake tip of the rail of FIG. 3;

FIGS. 7 and 8 are two schematic views, one elevation and one side view, respectively, of an injector holding clamp;

FIG. 9 is a schematic view of the outer end of the rail of FIG. 3, in association with a clamp according to FIGS. 7 and 8;

FIG. 10 is a schematic elevation view which shows functional areas of the extrusion buckle;

FIGS. 11 and 12 are two schematic views, one elevation and one side view, respectively, of a design form possible but not restrictive, of a flat rail which can be made by the process according to the invention; and FIG. 13 is a schematic view of a plant according to the invention.

The invention concerns firstly (FIG. 1) a manufacturing process for a single-block fuel injection rail of the type which has (FIGS. 3 and 4), most generally, at least one or, most frequently or simply, one single hollow, rectinlinear main tube 1 to which is rigidly joined at least one fuel intake tip 2, at least one and generally several injector intakes 3 and rail fastening means 4.

The process according to the invention includes the following stages.

We heat an aluminium alloy billet 5 to a temperature in teh range from 440° C. to 450° C. and place it in this heated condition in a die 6 made of two parts 6a, 6b.

We carry out hot die work on the billet 5 and, for this purpose, we hammer it through the intermediate of the die 6 so as to provide it with a fully primary shape 7 which corresponds, significantly, at least to the outer shape of the rail to be made and which has, furthermore, one or several axial, in particular longitudinal, buckles 8, which consist of the extruded aluminium alloy.

We leave the primary form 7 made in this manner to cool down to ambient temperature.

We carry out a first cold machining run of the primary form 7, i.e., essentially, we cut it to the exact axial size required.

We remove the superfluous areas 8b from the extrusion buckles 8 while we leave the functional areas 8b in existence so as to obtain a secondary full form 9 which corresponds partly at least exactly to the outer form of the rack to be made, in view of allowing it later to be held in a precise position.

We place the secondary form 9 in a precision assembly 10 and we join the secondary form 9 rigidly to this assembly 10, in particular by mechanical clamping, so that the secondary form 9 is held firmly and in a precise positon by the assembly 10, while the outer ends 11 of the secondary form 9 have to display a drilling that remains accessible from the outside.

We cold-drill the secondary form 9 from the outer ends 11, using one or several drills 12 in order to achieve, successively, the main drilling 13 of the main tube 1 and the secondary drillings 2a, 3a for the fuel intake and the injector intake, and in order to obtain in this manner a tertiary drilled form 13.

We carry out a second cold-finishing machining run on the tertiary form 13 in order to achieve the detailed making of the fuel intake junction tips 2, in particular by threading the outer end of the rail, the injector intakes 3 and the rail fastening means 4.

We carry out electrochemical deburring and cleaning.

And, possibly and if required, we fit a plug 14 rigidly to the outer end of the main tube by welding or brazing.

The billet 5 used for applying the process has, for instance, a general parallelepiped or cylinder-shaped form and it is made of aluminium alloy, in particular of an alloy such as A-G3M (AFNOR standard 004) or A1MO3 (DIN standard 1749).

The billet 5 is heated to a temperature level that allows for deformation by die-working. The primary form 7 displays the outer and general shapes of the main tube 1, of the tip(s) 2, of the injector intakes 3 and of the fastening means 4. However, the detail forms and the drillings are not yet being made at this stage of the process.

The buckles 8 are generally arranged in an axial plane of the main tube 1, on both sides of the latter, depending on the plane of junction of the two parts 6a, 6b of the die 6. This axial plane of the main tube may be, possibly, that of all or part of the fuel intake tip 2 centerlines or of the injector 3, intake centerlines or, on the contrary, it may not have these centerlines. Normally, the buckles 8 extend over the entire length of the main tube 1 as well as axially from the outer ends of the tube 1. The extent of the buckles from the main tube 1 depends on the amount of aluminium alloy extruded, with the free edge of the buckle 8 therefore liable to display quite a variety of forms and positions. In the neighbourhood of the main tube 1, at least, the thickness of the buckle 8 is known and more or less constant. As a variant, a buckle 8 displays the shape of a more or less incurved flat, depending on the form of the junction between the two parts 6a, 6b of the die 6.

Because of the process applied, the fibres of the alloy that makes up the primary form 7 are bundled parallel one to the other.

The cooling phase is aimed at having the primary form 7 cooled down to a temperature where it can be handled without changing its shape and were it can be cold-machined.

Cutting to the exact axial size required allows for removing the free end sections of the main tube 1 and the axial extensions of the buckles 8. It allows for producing two clear and very accurately spaced end faces 11a of the main tube—to the degree of accuracy of he position of the cutting means 15 ued. These end faces 11a made in this manner are an essential basic size reference for the accuracy achieved in applying the process.

The superfluous areas 8b of the extrusion buckles removed are, in addition to the axial extensions of the aforesaid buckles 8, the buckle 8 areas that are the greatest distance away from the main tube 1 and, possibly, from the tips 2 and intakes 3, i.e. the areas abutting on the free edge of the buckle 8. Inversely, the functional areas 8b of the buckle 8 are abutting on the tube 1 while being more or less close to the latter, depending on the function to be performed (rigidification or fastening, in particular, as mentioned above). The removal of the superfluous areas 8a may be carried out with high level dimensional accuracy, in combination with the reference provided by the end faces 11a.

The secondary form 9 therefore has certain high precision dimensional characteric features that serve as dimensional and positional references (end faces 11a, limit of functional areas 8a) while, on the other hand, the drilling and the detailed finishing have not yet been carried out. These dimensional references are such that the secondary form can co-operate, with precision, with the assembly 10.

The assembly 10 may display, for instance, two parts 10a, 10b joined on to the other by mechanical clamping means 10c.

As already mentioned above, the assembly 10 is designed in such a manner that with the secondary form 9 positioned and held firmly in place by the assembly 10 or by cold procedure, its ends 11, that have to be drilled, will remain accessible. These ends 11 are the ends 11a of the main tube 1 and the ends 11b and 11c of the tips 2 and intakes 3.

During the drilling, the secondary form 9 is being held firmly by the assembly 10, which is being held itself in position with respect to the centerlines of the drills 12. The secondary drillings 2a, 3a are made simultaneously or successively from the ends 11b, 11c. The accuracy of the position of the drillings 1a, 2a, 3a is being provided, firstly, by the precision of the position of the secondary form 9 in the assembly 10 as mentioned above, and secondly, by the precision of the drills 12 themselves.

To note that the drilling technique applied allows not only for making the drillings 1a, 2a, 3a accurate with regard to size and position, but also for obtaining thin walls and junctions of excellent grades between the drillings 1a, 2a, 3a.

The second machining run is aimed at carrying out the finishing operations not yet carried out during the first machining, in particular of the outer forms of the tips 2, intakes 3, means 4 and the exits of the drillings 1a, 2a, 3a.

The electrochemical deburring and cleaning are designed to eliminate any trace of undesired asperities, borings, contaminations, traces of the electrochemical bath. Furthermore, the electrochemical deburring allows for rounding the junctions between drilling 1a and drillings 2a, 3a.

In the event where, depending on the rail design required, the opening of the main drilling in the end 11a is not desired, this opening can be sealed by means of a plug fitted by welding or brazing.

To note that the process applied allows for making blind drillings 1a, 2a, 3a.

According to the invention, we remove the superfluous areas 8b of the extrusion buckle 8 while we leave all or part of the edge of the buckle abutting on the main tube 1 in existence, so as to form, at least, one single-block, continuous or not, longitudinal rigidification bulge 16 that came from the manufacturing process with the main tube.

As a variant, we also keep as a functional area 8a, areas that serve as fastening means 4.

Also, according to the invention, we use a die 6 and we perform die-working in such a manner as to obtain one cross bossing 17, at least, on an injector intake 3, with this boss 17 being single-block and coming from the manufacturing process with the main tube 1 and the injector intake 2.

As shown by the description above and that of the process according to the invention, the main tube 1, the tips 2, the injector intakes 3, the fastening means 4 (made, in particular, from buckle 8), the bulge(s) 16, the bosses 17 are made simultaneously during the die-working and the machining and they are forming a single-block unit, without welding or brazing, without any assembled part. The fibers of the aluminium alloy are inclined in the direction that is best for the strength of the rail.

In one feasible design we use a die 6 and die-work in such a manner as to achieve a flat injection rail made of several main tubes 18, 19, 20 joined by one or several cross tubes 21, 22; we drill in such a manner as to have the conduits of the main tubes and of the cross tubes 18, 19, 20, 21, 22 in communication; we fit, by way of welding or brazing, to a main tube and/or cross tube, one or several plugs 14 designed for sealing the non-used drilling ends.

The invention then proposes a plant (FIG. 13) for the application of the process, with this plant consisting of a production line with upflow and downflow and more or less imbricated in-between, one die-working station 23 equipped with heating means 24, one first machining station 25 with cutting means 15, one drilling station 26, one second machining station 27, separate or not from the first machining station, one electrochemical deburring and cleaning station 28 and, possibly, one plug welding or brazing station 29.

This production line may be set up as one single unit or, on the contrary, as several separate units.

The station 23 includes the die 6 in two parts 6a, 6b equipped with heating means 24 and it allows for heating the billet 5 and for providing it with the primary form 7. For this purpose, the two parts 6a, 6b of the die 6 are forming a mold that corresponds to the outer shape of the prmimary form 7. With this die 6 are associated stamping means.

The first machining station 25 has cutting means 15 that allow for cutting the primary form 7 to the required axial size and for removing the superfluous areas 8b of the buckles 8. The cutting means 15 are designed to suit the alloy to be cut.

Between the two stations 23, 25 may be installed, possibly, a cooling station designed to bring down the temperature of the primary form 7 from the billet 5 temperature to ambient temperature. In general, the primary form 7 cools down in the free atmosphere and no special cooling station is required.

The drilling station 26 may have the form of a machine that has, firstly, one and generally several juxtaposed supports for the assemblies 10. Each assembly 10 can be made of several, in particular of two parts 10a, 10b with a mold that corresponds to the secondary form 9. As already mentioned above, the preliminary cutting of the primary form in the machining and cutting station 25, 15 allows for obtaining a highly accurate position of the secondary form 9 in the assembly 10, that after having been clamped by mechanical clamping means 10c also ensures that the secondary form 9 is held firmly in place. This firm support, in an accurate position, of the secondary form 9 held by the assembly 10 is one of the conditions for the design accuracy of the plant. The drilling station 26 is provided, secondly, for each assembly 10 or assembly support, with, at least, one drill 12 and, in particular, one main drill 12a designed for the main drilling 1a and one or several secondary drills 12b designed for the secondary drillings 2a, 3a of the tips and intakes 2,3.

The drills 12a, 12b may be held by a head with which are associated rotary drill drives and axial drill slides. This head also provides the relative directions of the various drills 12a, 12b, in particular of the secondary drills 12b as compared to the main drill 12a. This head can also allow for adjusting the drills 12 according to the rail to be made. Consequently, the plant according to the invention and, in particular, the drilling station 26, allows for making rails of very different forms, simply by adjusting the drilling station 26. As mentioned already above, the assembly 10 is designed so that the ends 11 of the secondary form 9 are accessible from the outside in order to allow for inserting the drills 12. The drilling station 26 is also designed in such a manner that the drillings 1a, 2a, 3a may have a controlled axial length, in particular that they may be blind drillings. At the exit of the drilling station 26 we obtain the tertiary form 13 that has been drilled.

The second machining station 27 allows for making the details of the tips 2, the intakes 3 and the means 4 as well as of the openings of the drillings 1a, 2a, 3a of the tertiary form 13.

The electrochemical deburring and cleaning station 28 allows for achieving the deburring and the cleaning of the tertiary form 13, in particular in view of rounding the junctions between the drilling 1a and the drillings 2a, 3a and of removing the borings and contaminations caused by the manufacturing process.

The detailed design of the various stations of the plant is within the understanding of the professional.

It is well understood that the plant also includes suitable conveyor systems between the various stations.

The invention finally proposes an injection rail characterized in that it is obtained by using the process and/qr the plant described above. As already mentioned above, the rail includes:

at least one rectilinear hollow main tube with, rigidly associated, at least one fuel intake tip 2, at least one and, generally, several injector intakes 3, rail fastening means 4.

Through the combined use of an aluminium alloy as material for the process described above, the rail according to the invention is single-block; light-weight; weldless (except, possibly, for the weld of a plug 14); of a generally very distorted and complicated form, in particular where the direction of the tips 2 and intakes 3 as compared to the main tube 1 is concerned; with innter connections between the main tube 1 (i.e. drilling 1a) and the tips and intakes 2, 3 (i.e. the drillings 2a, 3a), that are rounded; with aluminium alloy fibres in parallel all in the same direction; with excellent rigidity, exellent torsional and buckling strength as well as impact resistance, with high presure resistance; with a homogenous internal structure.

For example, the rail according to the invention may have an overall length of about 53 cm with 3 injector intakes 3, with the thickness of the rail walls varying from 2 mm (for the main tube 1) to 1/10th of one mm (for the exit of the tips 2 and intakes 3), and with the main tube 1 displaying an outside diameter of about 20 mm, with the main drilling 1a having a diameter of about 14 mm. Such a rail may have a weight of about 155 grams. As shown from the text above, the angle between the centerline of the main tube 1 and the centerlines of the tips 2 and intakes 3 may be changed to any degree according to requirements, either conventionally to 90° or to any other degree (15°, 30° or others).

Furthermore, the process according to the invention allows for making dual rails i.e. where the main tube 1 has two separate drillings, one for the inflow and one for the return flow of the fuel (not shown) or "flat" rails (described later with reference to FIGS. 11 and 12).

We now describe a design that is possible but not at all restrictive, for a rail by referring to FIGS. 3 to 10, emphasizing that the characteristic features described will apply also to other possible designs, including the dual and "flat" rails mentioned above.

Such a rail according to the invention is more specifically designed for an injection engine for automobiles were it is installed between one or several fuel supply conduits and injectors (not shown). Such injection engines and the automobiles for which they are designed require injection rails that display combined characteristic features of form, lightness, rigidity, strength hitherto unknown.

According to the invention, such an injection rail has, at least, one longitudinal rigidification bulge 16, i.e. that extends the length of the main tube 1 and outside of the latter, that is continuous or not, regular or not, single-block and derived from the manufacturing process with the main tube 1. More precisely, the bulge 16 consists of the buckle 8 area abutting on the tube 1, with this buckle 8 achieved, as mentioned above, during the making of the primary form 7 by extruding the material (aluminium alloy) between the two parts 6a, 6b of the die 6. The bulge 16 may display, for instance and preferably, a generally square (or rectangular) outline with a side size from 2 to 2.5 mm (as compared to a main tube 1 with an outer diameter of about 20 mm). This bulge 16 may also display, possibly and if required, an outline of different shape, in particular of triangular or trapezoidal shape. The bulge 16 extends, preferably, over the entire length of the main tube 1 but it may also extend only, if required, over part of the length of tube 1. The bulge 16 may be, preferably, continuous or, on the contrary, discontinuous. The bulge 16 may be entirely or partly, rectilinear and parallel to the centerline of tube 1 and/or entirely or partly incurved, depending on the shape given to the (more or less incurved) junction plane or level of the two parts 6a, 6b of the die 6. Furthermore, the bulge 16 may display a regular and constant form the length of tube 1 or, on the contrary, a form that may vary according to the requirements of the strength desired. Finally, the bulge 16 may be located in any location desired and, in particular, for instance, in a position facing the injector intakes 3. Preferably, two bulges 16 are provided for, facing one another more or less diametrically and being more or less identical. However, the invention also concerns the cases of a single bulge or of more than two bulges or of bulges that are not facing one another or of bulges that are not identical. These characteristic features regarding their number, their position, their shape (cross and longitudinal), their regularity (or irregularity), their continuity (or discontinuity), their size allow for the bulge(s) 16 a large variety of applications obtained through the process of the invention and for achieving the rigidifications desired both where their location and extent are concerned, without thereby affecting the other characteristic features of the rail, in particular its lightness.

According to another characteristic feature, the rail displays, at least, one cross bossing 30 on an injector intake 3, with this boss 30 being single-block and derived from the manufacturing process with the main tube 1.

More specifically, the rail displays a boss 30 of generally cylinder-shaped form with a circular base, placed in the connecting area of the injector intake 3 and of the main tube 1 and towards the outside of the latter, with which may co-operate an injector holding claim 31, with the injector intake 3 displaying a cylinder-shaped outer face 32 with a circular base, in particular on the side of its free end 11c.

The centerline 33 of the boss 30 is (FIGS. 5 and 6) perpendicular to the plane formed by the centerlines of the drillings 1a and 3a and the boss 30 is positioned in the end sectionof the linkage injection intake 3 with the main tube 1.

The boss 30 is preferably finished, at its free end, by a round 34 that makes installing the clamp 11 easier. The boss 30 has a height and a diameter designed to allow for holding the clamp 31, in particular of about 5 mm (for a rail as described above).

The existence of the boss 30 and of the clamp 31 allows for holding the injector in the injector intake 2 without requiring on the outer face of the injector intake any groove, recess or similar that could affect the strength of the injector intake or produce increased thickness.

We are now referring to FIGS. 5, 7, 8, 9 regarding the clamp 31 that is a part of the invention. The clamp 31 is made essentially of three parts: one catch 35 for clasping the rail, of generally plane shape, with one hole 36 at one of its ends 37 cooperating with the boss 30, with this catch 35 applied to the outer face 32 of the injector intake 3, in parallel with its centerline; one plane fork 38 fitted rigidly to the catch 35, perpendicularly to its other end 39, with this fork 38 displaying a hollow 40 with an opening pointing outwards, with which can cooperate—by cross sliding via the opening—a groove of the injector as the hollow 40 is installed, when the clamp has been fitted to the rail, facing (and coaxially) the exit of the drilling 3a; with the fork 38 then installed on the end 11c and , finally, an elastic clasp 42 fitted rigidly to the catch 35 in the immediate neighborhood of the fork 38, with the two incurved legs of the clasp 42 placed on either side of the hollow 40 so as to be applied firmly and by elastic deformation to the outer face 32 of the injector intake 3. Preferably, the legs of the clasp 42 open toward their free end 43 to make the insertion of the injector intake 3 into the clasp 42 easier.

The clamp 31 is made entirely, for example, of metal from a band.

Accordingly to one feasible design (FIGS. 11 and 12), the rail is "flat" and consists of one, generally of several cross tubes 21, 22, with the fuel and injector intakes 2, 3 as well as the fastening means associated with the main tubes and/or with the cross tubes 18, 19, 20, 21, 22 and with the rail having one or several sealing plugs 14 for the non-used drilling ends of the main tubes and/or cross tubes 18, 19, 20, 21, 22.

All the characteristic features described above are applicable to the "flat" rail as described.

Such a "flat" rail has the advantage of allowing for being integrated very completely in an engine; the injection rail thus loses its nature of a "fitted part" that it normally displays. Such a "flat" rail can be the object, naturally, of numerous detaled design variants, in particular where the number and the arrangement of the mair and cross tubes 18, 19, 20, 21, 22, the number and the direction of the injector intakes 3, the general form of the rail are concerned.

According to one characteristic feature of the invention, the buckle 8 made of material extruded during the die-working process amy be used not alone for making the bulge 16 but also as a functional area that makes up, in particular, the fastening means 4. This characteristic feature may be applied in the case of the "flat" rail.

In one feasible design variant, a plug 24 is fitted by welding to the end 11a of the side where the drilling of the opening 1a commenced. In another variant, the drilling 1a if tapped at this end 11c.

What is claimed is:

1. A manufacturing process for a single-block fuel injection rail of a type wherein said rail comprises at least one rectilinear hollow main tube (1) to which are joined rigidly at least one fuel intake tip (2); at least one and generally several injector intakes (3), and rail fastening means (4), the improvement comprising:

heating an aluminium alloy billet (5) to a temperature in the range from about 430° C. to about 460° C. and, while in a heated condition, hot die forming in a die (6) made of two parts (6a, 6b), said hot die-forming comprising extruding said billet through an intermediate of said die (6) so as to provide said billet with a full primary shape (7) which corresponds to an outer shape of said rail to be made and which primary shape has one or several buckles (8) of an extruded aluminium alloy;

cooling said primary form (7) to an ambient temperature level;

cold machining said primary form (7), said cold machining comprising:

cutting to an exact axial size required;

removing at least one superfluous area (8b) of the extrusion buckles (8);

retaining at least one functional area (8a) from said extension buckles in existence so as to obtain a secondary full form (9) corresponding partly to an outer form of the rail to be made;

precision jigging said secondary form (9), including joining said secondary form (9) rigidly to a jigging assembly (10) such that the secondary form (9) is held firmly and in a precise position by jig (10) while outer ends (11) of the secondary form (9) remain accessible from the outside for drilling;

cold drilling the secondary form (9) from the outer ends (11) in order to achieve, successively, drilling (a) of the main tube (1) and secondary drillings (2a, 3a) for the fuel intake and the injector intake such as to obtain a tertiary drilled form (13);

cold-finishing machining said tertiary form (13) for forming fuel intake (2) junction tips and fastening means (4) for said rail;

electrochemically deburring and cleaning said tertiary form; and optionally fitting a plug (14) rigidly to the outer end of said main tube by welding or by brazing.

2. The process according to claim 1, including removing superfluous areas (8c) of an extrusion buckle (8) while retaining all or part of a buckle edge abutting said main tube (1) so as to obtain a single-block, longitudinal rigidification bulge.

3. The process according to claim 1, including hot die forming so as to make at least one cross bossing (17) on an injector intake (3), whereby said bossing (17) is of a single-block and derived from said main tube (1) and said injector intake (2).

4. The process according to claim 1, including hot die-working said billet in such a manner as to obtain a flat injection rail made of several main tubes (18, 19, 20) linked by one or by several cross tubes (21, 22); drilling in such a manner as to have the conduits of the main tube and cross tubes (18, 19, 20, 21) in communication; and brazing or welding, on a a main tube and/or cross tube, one or several plugs (14) for sealing.

5. The process according to claim 1, including machining a buckle (8) in such a manner as to obtain on this buckle (8) one or several functional areas (8a) that make up all or part of the fastening means (4) for said rail.

* * * * *